United States Patent [19]

Taylor

[11] 4,182,529
[45] Jan. 8, 1980

[54] VEHICLE DIVERTING ENERGY ABSORBER BUMPER SYSTEM

[75] Inventor: Paul H. Taylor, Grand Island, N.Y.

[73] Assignee: Tayco Developments, Inc., North Tonawanda, N.Y.

[21] Appl. No.: 809,648

[22] Filed: Jun. 24, 1977

[51] Int. Cl.² .................. B60R 19/00; B60R 21/14; B61F 19/00; B61G 11/00

[52] U.S. Cl. .................................. 293/132; 293/155; 180/274

[58] Field of Search ............... 188/1 C; 180/91, 82 R, 180/103 A, 64 R; 293/24, 38, 48, 60, 70, 73, 85, 86, 89, 96, 98, 99, 132-137, 155

[56] References Cited

U.S. PATENT DOCUMENTS

| 1,740,576 | 12/1929 | Costaganna | 293/86 |
| 1,855,977 | 4/1932 | Llobet | 293/89 |
| 2,873,994 | 2/1959 | Omps | 293/86 |
| 3,717,224 | 2/1973 | Leach | 188/1 C |
| 3,794,348 | 2/1974 | Fischer | 188/1 C |
| 3,801,147 | 4/1974 | Barriett | 293/73 |
| 4,031,978 | 6/1977 | Taylor | 293/1 |

Primary Examiner—Stephen G. Kunin
Assistant Examiner—D. W. Keen
Attorney, Agent, or Firm—Joseph P. Gastel

[57] ABSTRACT

An energy management system for a vehicle having a vehicle frame, a high strength bumper having a central portion and outer end portions, a first energy absorber unit coupled between the vehicle engine and the central portion of the bumper, additional energy absorber units coupled between the frame and the outer end portions of the bumper, and pivotal connections between the energy absorber units and the bumper to permit the bumper to swing to a deflecting position upon engagement with an obstruction such as a pole while the energy absorber units absorb the shock of impact.

17 Claims, 15 Drawing Figures

VEHICLE DIVERTING ENERGY ABSORBER BUMPER SYSTEM

BACKGROUND OF THE INVENTION

The present invention relates to an improved energy management system and more particularly to an energy absorbing bumper system for a vehicle which both absorbs the energy of impact and permits a high strength bumper to deflect without being deformed to guide the vehicle on which it is mounted around a pole or similar obstruction with which the vehicle collides.

The present invention is a modification of the invention disclosed in my copending application Ser. No. 581,544, filed May 28, 1975, now U.S. Pat. No. 4,031,978, issued June 28, 1977.

In my prior U.S. Pat. No. 4,031,978, an energy management system is disclosed wherein the vehicle engine, transmission, and drive train are coupled to the vehicle bumper through an energy absorber unit so that the force of impact is opposed by this portion of the vehicle. In this system two additional energy absorber units are mounted on opposite sides of the central energy absorber unit and between the bumper and the frame of the vehicle. By the use of the foregoing system, the weight of the vehicle and bumper combination can be reduced by 25% without endangering the vehicle occupants in a collision because the momentum of the engine and its associated drive train is utilized to oppose the force of impact.

In the past, bumpers were made relatively heavy, that is, they generally weighed in the area of 60 to 70 pounds. Furthermore, they were made of relatively low yield strength materials, in the neighborhood of about 50,000 pound per square inch. Whenever a vehicle carrying a bumper of the foregoing type struck a pole, the momentum of the bumper tended to cause it to wrap itself around the pole because the portion contacting the pole yielded on impact while the adjacent portions tended to continue to move forwardly. This action essentially caused the vehicle to be captured by the pole and caused the kinetic energy of the vehicle to be reduced in an extremely short period of time, thereby causing the vehicle occupants to be thrown forwardly and ultimately causing the vehicle engine to be pushed rearwardly into the passenger compartment.

SUMMARY OF THE INVENTION

The present invention overcomes the above-discussed deficiency by utilizing, in combination with a plurality of energy absorber units, a relatively lightweight, high strength bumper which will not deform under impact but will yield against the bias of the energy absorber units to provide a camming surface which causes the vehicle to be guided around a pole or similar obstruction which it engages, thereby permitting the vehicle to dissipate its momentum over a longer period of time with the attendant reduction of injury to the vehicle and its occupants.

It is accordingly the primary object of the present invention to provide an energy management bumper system which provides increased protection to a vehicle and its occupants for pole impacts by a combined action of diverting the vehicle from the obstruction, and simultaneously absorbing the energy of impact, thereby reducing property damage and physical injury.

Another object of the present invention is to provide a bumper energy management system which will permit reduction of vehicle weight by providing increased energy absorbing capacity, and by thus reducing vehicle weight will minimize energy consumption while at the same time providing a safety environment for the vehicle occupants equivalent to that obtainable in heavier vehicles.

A further object of the present invention is to provide an improved bumper energy management system which utilizes a high strength, lightweight bumper construction in conjunction with a plurality of energy absorber units and in which the bumper will be reinforced by the frame of the vehicle after the bumper deflects to thereby assure the desired camming action of the bumper. Other objects and attendant advantages of the present invention will readily be perceived hereafter.

The improved energy management system of the present invention comprises a vehicle frame, high strength bumper means having a central portion and outer end portions on opposite sides of said central portion, mounting means mounting said central portion relative to said frame for permitting said outer end portions to effectively swing about said central portion, and impact energy absorber unit means effectively mounted between said outer end portions and said frame to thereby absorb the shock of impact while said high strength bumper tends to maintain its original configuration outwardly of said central portion toward said outer end portions to thereby deflect said vehicle after impact. Preferably the central portion of said bumper is connected to the vehicle engine and drive train by means of an impact energy absorber unit so that upon impact, the forward movement of the vehicle engine and vehicle drive train will be opposed by the central impact energy absorber unit to thereby aid in dissipating the momentum of the vehicle while the deflection of the bumper guides the vehicle about the body with which it had an impact. The various aspects of the present invention will be more fully understood when the following portions of the specification are read in conjunction with the accompanying drawings wherein:

DESCRIPTION OF THE PREFERRED EMBODIMENTS

Figure 1:
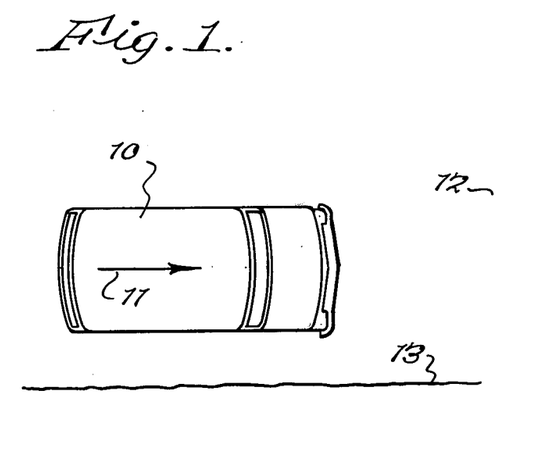
FIG. 1 is a plan view of a vehicle traveling in a normal manner along a road.
Figure 2:
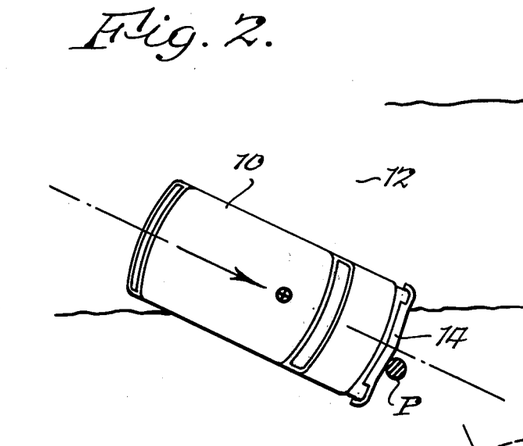
FIG. 2 is a view similar to FIG. 1 but showing how the vehicle has left the road and has made initial contact with a pole while traveling at a normal rate of speed, for example, 40 miles per hour.
Figure 3:
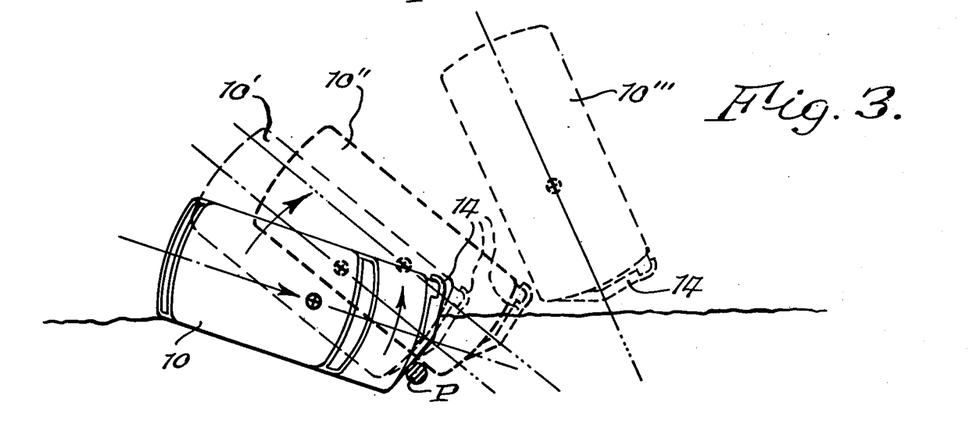
FIG. 3 is a schematic plan view showing how the energy diverting bumper of the present invention has pivoted to effect a camming diversion of the vehicle to cause it to be diverted away from the pole so that its momentum will be dissipated relatively slowly to thereby result in minimum damage to the vehicle and occupants.
Figure 4:
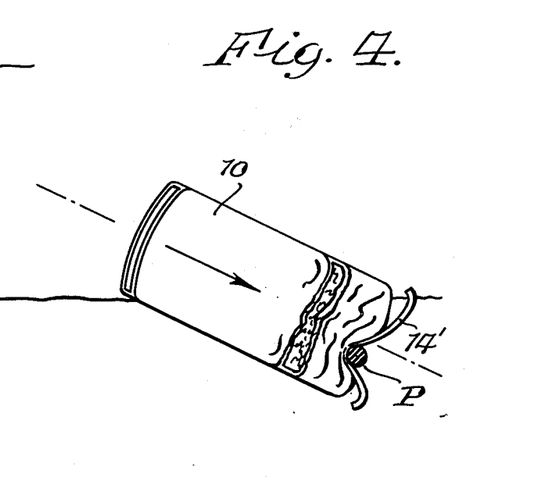
FIG. 4 is a schematic view similar to FIG. 2 but showing how the conventionally mounted relatively weak bumper of a vehicle wraps itself around a pole after impact, thereby causing relatively severe damage to the vehicle and its occupants.

By way of general background, FIG. 1 illustrates a conventional vehicle 10 traveling in a direction 11 along a road 12 having an edge 13. In FIG. 2 the vehicle 10 is shown immediately after having left road 12 at the instant its bumper 14 engages a pole P. FIG. 4 illustrates what normally happens when the vehicle mounts a conventional bumper which wraps itself around pole P, thereby captivating the vehicle and its occupants with a short stroke, high force deceleration which may result in extremely high injury to the vehicle. Conversely, in FIG. 3 it is shown how a vehicle with the improved energy management system of the present invention reacts upon engaging pole P. In this respect, the bumper 14 will yield and a plurality of energy absorber units will absorb a certain amount of the impact energy, but since bumper 14 is fabricated from high strength material, it will not wrap around the pole P as shown in FIG. 4. Consequently, the bumper will provide a deflecting or camming action in which the vehicle is successively moved from position 10 to position 10', 10" and subsequently to position 10'". In other words, when the off-center impact shown in FIG. 3 occurs, the vehicle will tend to slide sideways from the position shown in solid lines to the position shown at 10' and thereafter the combination of forces acting on the vehicle will cause it to move to the position shown at 10" wherein it slides by the pole P and thereafter the vehicle will continue to skid sideways to the position shown at 10'". The dissipation of the momentum of the vehicle in this manner will be less injurious to the vehicle occupants and the vehicle because the vehicle is decelerated for a relatively long time over a relatively long distance, thereby reducing the deceleration forces to more acceptable levels.

Figures 5, 6:
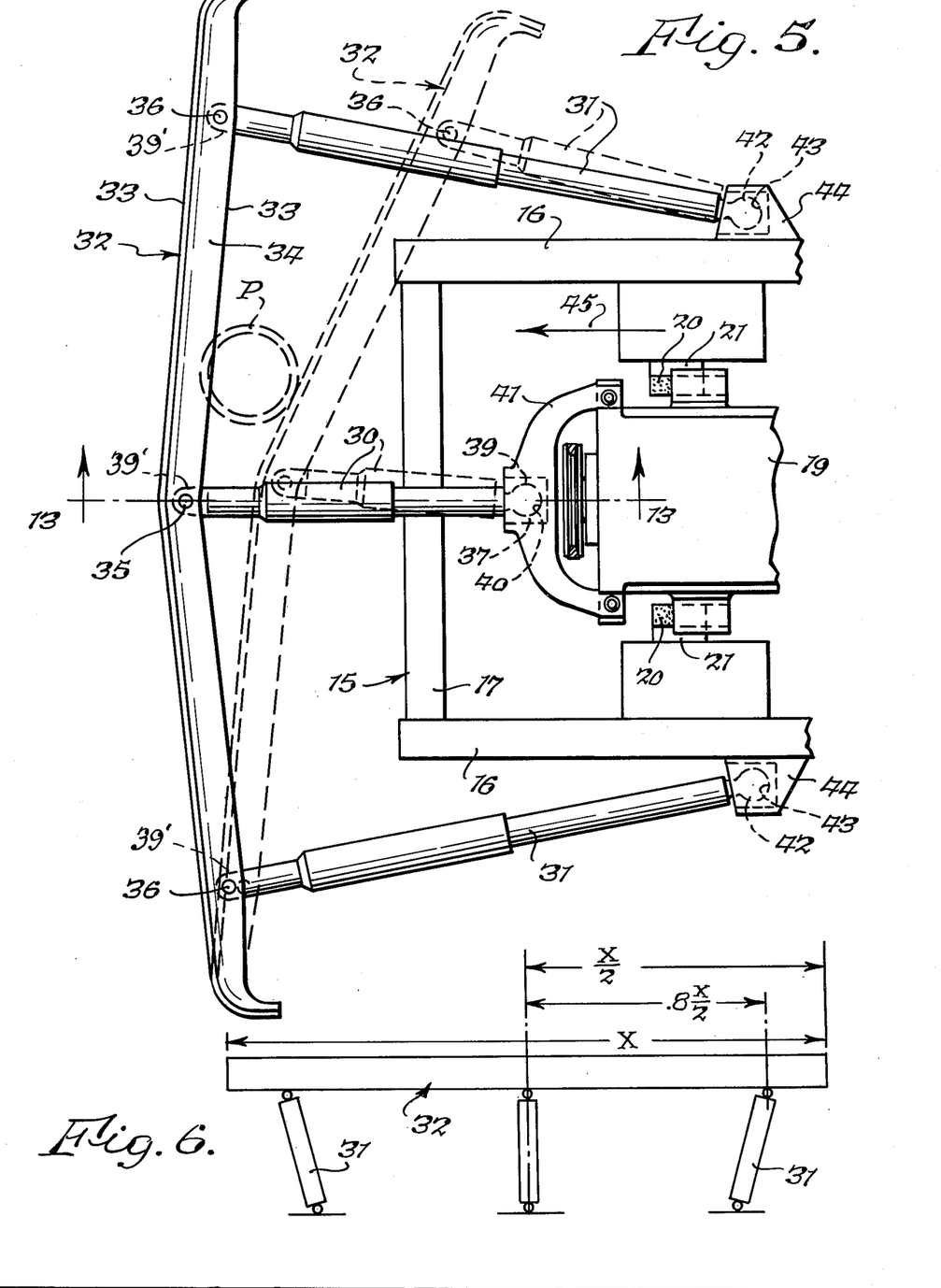
FIG. 5 is a fragmentary plan view of the improved energy management system of the present invention in which a central impact energy absorber unit and two outer impact energy absorber units have first ends pivotally connected to a high strength bumper with the second ends of the outer units being pivotally connected to the frame of the vehicle and the second end of the central unit being pivotally connected to the engine which is mounted on the frame of the vehicle.
FIG. 6 is a diagrammatic view showing the geometry of the bumper and the impact energy units mounting it to the vehicle for providing a minimum weight bumper system.

One form of the improved energy management system of the present invention is shown in FIG. 5. A vehicle frame 15 consists of side members 16 joined by a cross member 17. The frame may be of a conventional construction and portions thereof have been omitted in the interest of brevity. A vehicle engine 19 is supported on conventional rubber engine mounting members 20 which are preferably stressed rearwardly between engine 19 and vehicle frame members 21. As explained in detail in copending application Ser. No. 581,544, filed May 28, 1975, which has issued as U.S. Pat No. 4,031,978 on June 28, 1977, it is preferred that engine 19 be stressed rearwardly on its mounting. In this respect, the energy absorber units 31 in FIG. 5 are stretched to their maximum length, whereby they will provide the pulling force on bumper 32 which acts through energy absorber unit 30 to stress engine 19 rearwardly in its mounts to get the same effect as in my prior U.S. Pat. No. 4,031,978. A suitable stop structure, not shown, prevents cylinder 47 from being withdrawn from cylinder 53. This stop structure may comprise a pin between the outer sleeve 53 and cylinder 47 which acts as a limit stop. This stressing achieves the same result as stressing the engine rearwardly on its mounts by forcing it rearwardly by the central impact energy absorber unit 30 as described above in detail in my previous U.S. Pat. 4,031,978. At this point it is to be noted that the energy absorber unit 30 can provide 25% of the energy absorbing capability of the system. In addition, either of the outer impact energy absorber units 31 will provide an additional 75% of energy absorbing unit capabilities. As noted in my prior U.S. Pat. No. 4,031,978, the utilization of a system such as shown in FIG. 5 wherein the engine and associated drive train is coupled to the bumper permits weight reduction of the vehicle because the drive train shock is no longer borne by the vehicle frame. In other words, in prior installations the drive train shock was transmitted to the frame at various areas at which it was connected thereto. However, with the system of FIG. 5, as explained in detail in my prior U.S. Pat. No. 4,031,978, the drive train shock is transmitted directly to the bumper 32 through the energy absorber unit 30 and the shock of the vehicle frame 15 is transmitted directly to the bumper 32 through outer energy absorber units 31. Because of the foregoing orientation of energy absorber components, the shock of center pole impacts is absorbed in a highly efficient manner.

Figure 13:
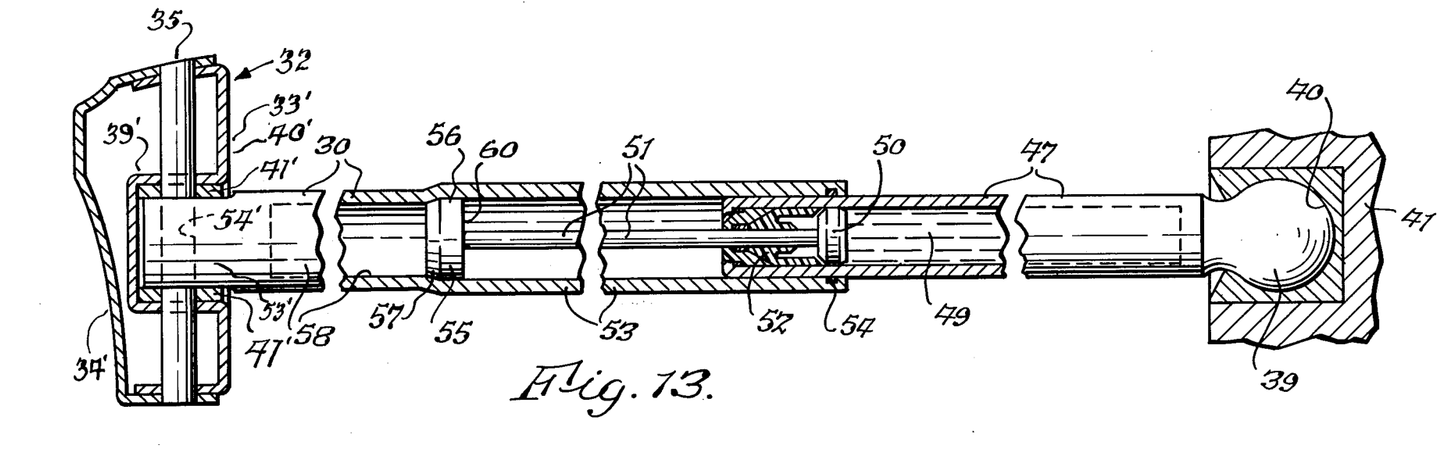
FIG. 13 is a fragmentary cross sectional view taken generally along line 13—13 of FIG. 5 and showing the construction of the impact energy absorber unit which utilizes both liquid and dry energy absorbing structure, this view showing the relative positions of the various parts prior to impact.
Figure 14:
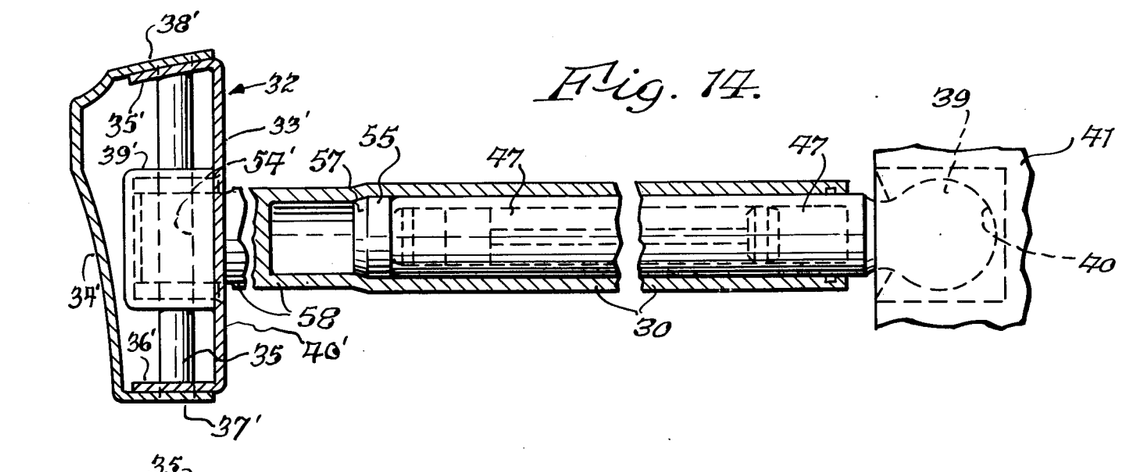
FIG. 14 is a view similar to FIG. 13 but showing the relative positions of the various parts after an impact which exceeded the energy absorbing capability of the liquid portion of the impact energy absorber unit, and also showing the bumper mounting structure in side elevation.

As noted in my prior U.S. Pat. No. 4,031,978, the bumper system shown in FIG. 5 permits the vehicle to have a lighter bumper and frame because the impact load is distributed over three energy absorber units, namely, units 30 and 31. In accordance with the present invention the bumper 32 is fabricated from lightweight, high strength steel which will not buckle into the configuration shown in FIG. 4 upon impact with pole P and therefore the high strength bumper in combination with the impact energy absorber units 30 and 31 will act as a deflector to cam the vehicle around pole P after initial engagement. In the foregoing respect, the bumper 32 may be fabricated in the substantially rectangular cross sectional configuration in FIGS. 13 and 14. The cross sectional configuration in FIG. 13 is through the pivotal mounting structure 39' while the cross section in FIG. 14 includes a side elevational view of the pivotal mounting structure 39'. Bumper 32 is fabricated from two channel-like members 33' and 34', with the legs 35' and 36' being received within the legs 37' and 38' and suitably secured thereto, as by welding. At each pivot point 35 and 36 a mounting structure 39' is provided, as shown in FIGS. 13 and 14, and pin 35 extends through the mounting structure 39' and a bore 54' in cylinder end 53' with the outer ends of pin 35 being received by the overlapping contiguous legs of the channels 33' and 34'. Mounting structure 39' is a pocket formed out of the rear wall 40' of channel 33'. The end 53' of cylinder 53 fits into pocket 39' and reinforcing plates 41' take up the space between end 53' and the upper and lower sides of the pocket 39'. An identical pivotal mounting construction is used at pins 36. It will be appreciated that bumper 32 may be fabricated out of other suitable cross sectional configurations.

Bumper 32 is preferably fabricated out of any high strength, lightweight material, for example, 300,000 pound per square inch yield strengths precipitation hardened steel. A bumper of this type can be fabricated having a total weight of 21 pounds, as compared to the weight of 62 pounds of a conventional low strength bumper material having a yield strength of about 50,000 pounds per square inch. If desired, the weight of the bumper can be increased to approximately 30 pounds if 200,000 pound per square inch yield strength precipitation hardened steel is used. The optimum condition is to cause the weight of the bumper to be as light as possible and have the maximum yield strength so that the momentum of the bumper itself moving forward will not cause it to wrap around a pole and thus assume the configuration shown at 14' in FIG. 4. In other words, the lower the weight of the bumper, the less tendency there will be for the portions of the bumper on opposite sides of the pole P to fly forwardly and thus embrace the pole P with a cupping action, as shown in FIG. 4. The bumper of the present invention must have sufficient strength so that it will not deform on impact, as normally would occur with a relatively high weight, low strength bumper. In this respect, as noted above, current conventional bumpers have a yield strength in the range of approximately 55,000 pounds per square inch.

In FIG. 5 the central energy absorber unit 30 has a forward end which is pivotally pinned to the central portion of bumper 32 at 35. The outer ends of energy absorber units 31 are pivotally pinned to bumper 32 at 36, as noted above. The inner end of central energy absorber unit 30 includes a ball and socket connection at 37. This comprises a ball 39 which is received in socket 40 of yoke 41 which has its opposite ends rigidly secured to the engine 19. The ends of energy absorbers 31 remote from pivotal connections 36 are formed into balls 42 which are received in mating spherical sockets 43 located within brackets 44 rigidly secured to vehicle side frame members 16.

When a centerpole impact occurs, the bumper 32 will move from its solid line position in FIG. 5 to the dotted line position shown therein. This will cause central impact energy absorber unit 30 to collapse from the solid line position to the dotted line position and the energy absorber unit 31 at the top of FIG. 5 will also collapse to its dotted line position. The movement of all the energy absorber units to their dotted line positions can occur because of the pivotal connections at the opposite ends of each of the energy absorber units 30 and 31.

When the central energy absorber unit 30 collapses, there will be a liquid energy absorption and a dry energy absorption, as explained in detail in my prior U.S. Pat. No. 4,031,978, and as will be explained further hereafter. In addition, the movement of the engine 19 and its associated drive train forwardly in the direction of arrow 45 will also aid in neutralizing the force of impact and this energy will be absorbed by energy absorber 30 as explained in detail in my prior U.S. Pat. No. 4,031,978. Additionally, the deflection of bumper 32 to its dotted line position will be accompanied by an absorption of the impact energy by energy absorber 31 which moves to its dotted line position. When the foregoing occurs, the vehicle will tend to move to its position 10' shown in FIG. 3 because of the camming action of the front surface 46 of bumper 32 when it engages pole P. Therefore, the vehicle will tend to slide by pole P in a sideways manner as the energy of impact is being absorbed by energy absorbers 30 and 31. Furthermore, additional energy will be absorbed by the fact that the vehicle is now skidding sideway toward the position of 10' shown in FIG. 3. Eventually a position will be reached wherein the vehicle slides free of the pole P and tends to continue on in the attitude 10'" shown in FIG. 3 whereby the momentum of the vehicle will be dissipated gradually over a longer period of time with the attendant increased safety to the vehicle occupants and the lessened possibility of damage to the vehicle.

At this point reference is directed to FIGS. 13 and 14 for a description of the manner in which the energy absorber unit 30 operates, this description also being found in my above-mentioned U.S. Pat. No. 4,031,978. Energy absorber unit 30 includes a liquid energy absorbing portion and a dry energy absorbing portion. A cylinder 47 is provided which contains a suitable liquid 49 and receives piston head 50 mounted at the end of piston 51. The sealing arrangement 52 is conventional and may be the type shown in my prior U.S. Pat. No. 3,256,005. The end of cylinder 47 is formed into a ball 39 which is received in spherical socket 40, as mentioned above. A casing 53 has an internal diameter which closely approximates the external diameter of cylinder 47 to receive the latter with a tight sliding fit. An O-ring seal 54 is provided in a suitable groove in casing 53. Preferably casing 53 is fabricated by driving plug 55 into the position shown by a press, plug 55 including a cylindrical portion 56 and a frustoconical portion 57. Originally casing 53 was of the same diameter as casing portion 58, but it was expanded due to the driving plug 55 to the position shown in FIG. 13. The end 59 of piston 51 abuts surface 60 of plug 55.

Whenever energy absorber unit 30 is subjected to the force of impact, cylinder 47 will be driven to the left while piston 51 remains stationary. This will cause piston 51 to move into liquid 49 to absorb the energy of impact. The engine and drive train, which comprise approximately 25% of the weight of the vehicle, will tend to move to the left in FIG. 5 and will thus resist movement of energy absorber 30 to the right. However, in the event that the impact velocity is greater than a predetermined amount, for example, 5 or 10 miles per hour, casing 53 will move to the right and plug 55 will be driven from the position shown in FIG. 13 to the position shown in FIG. 14. This will provide a dry energy absorbing portion of the energy absorbing stroke in addition to the liquid energy absorbing portion. Because the energy is absorbed in this manner, it will be dissipated and therefore up to certain speeds will tend to eliminate the prior occurrence of the engine being forced into the passenger compartment. FIG. 14 shows the condition of the energy absorber unit 30 after total force absorption by the liquid portion thereof and additional impact energy absorption by the dry portion thereof. The action of the energy absorber unit 30 is described in greater detail in my prior U.S. Pat. No. 4,031,978 which is incorporated by reference herein. It is to be understood that energy absorber units 31 of FIG. 5 are identical to energy absorber unit 30, except for the length of the cylinders which are analogous to cylinder 47 and therefore a detailed explanation of the structure of energy absorber units 31 is not deemed necessary.

In FIG. 6 a schematic view is shown of energy absorbers 30 and 31 mounted relative to bumper 32 and showing the preferred geometric relationship therebetween. In this particular instance, the distance between the pivot points of the central absorber unit 30 and each of the outer absorber units 31 is 0.8x/2 or 0.4x, where x is the length of the bumper. This relationship was established for a 1977 AMC Gremlin car, and it will be appreciated that suitable variation from this relationship may be necessary for other types of cars. It was proposed that for the 1977 Gremlin, bumper 32 should have a yield strength of 200,000 pounds per square inch. The cross sectional configuration of the bumper as shown in FIGS. 13 and 14 should have an outer dimension of 6.75 inches by 3.50 inches and it should be 66 inches long. The stock to be used in fabricating bumper 32 is 0.070 inches thick, and the bumper should weigh 38 pounds. This system should perform satisfactorily at 30 miles per hour. The weight can be reduced by using 300,000 pound per square inch yield strength precipitation hardened steel.

Figure 7:
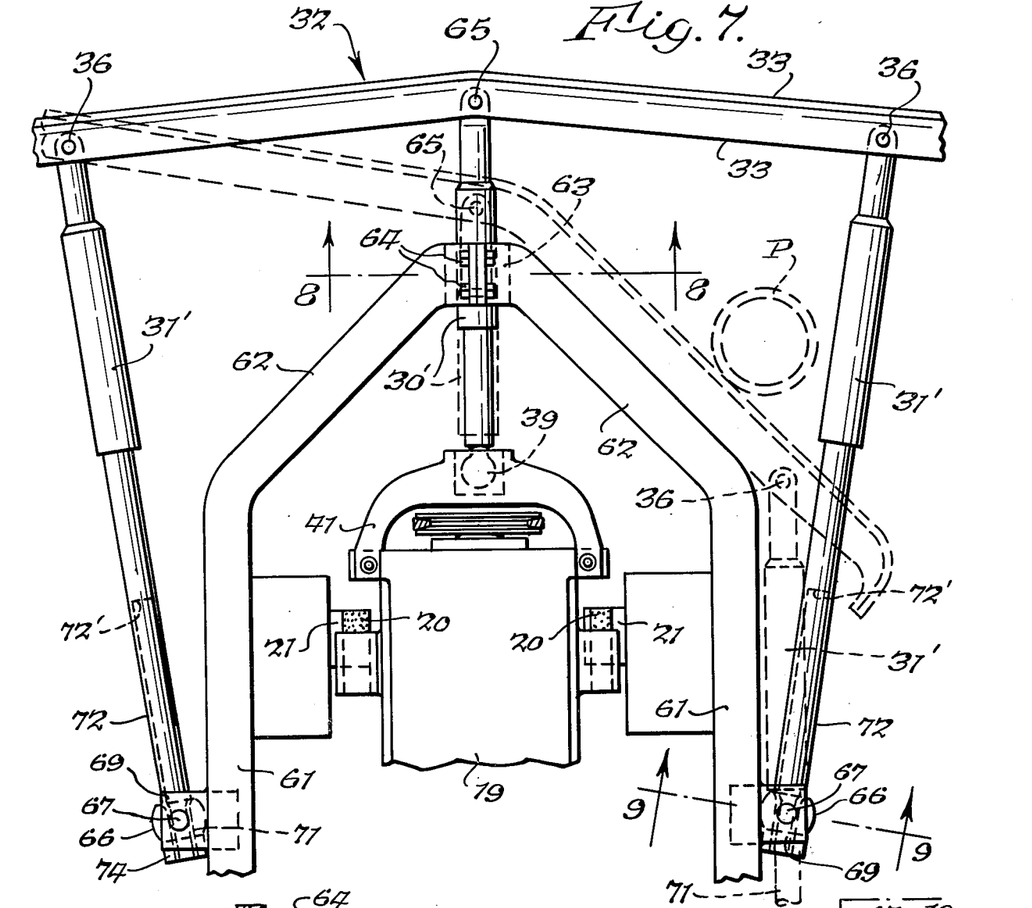
FIG. 7 is a fragmentary view similar to FIG. 5 but showing a vehicle frame with a triangular front portion to act as a backup structure for a high strength bumper which is calculated to bend at its center but act essentially as a rigid beam outwardly of its center portion.

In FIG. 7 a modified form of the subject matter of FIG. 5 is shown. In FIG. 7 the vehicle frame 61 has a triangular frontal portion wherein the two side frame members 62 converge in the shape shown. Engine 19 is mounted in the same manner described above relative to FIG. 5 and a yoke 41 is mounted on engine 19 for supporting the end 39 of the energy absorber unit. In the embodiment of FIG. 7, the energy absorber unit 30', which is analogous to energy absorber unit 30 of FIG. 5, is encircled by a rubber sleeve 63 which is clamped around unit 30' by nut and bolt assemblies 64 which hold the two frame portions 62 together. In the embodiment of FIG. 7, any impact with pole P will cause the central energy absorber 30' to move straight back rearwardly from the solid line position to the dotted line position. The center of bumper 32' is pivotally attached by pin 65 to the end of energy absorber unit 30'. However, in this embodiment the area of bumper 32' around pin 65 is weakened so that the bumper 32' can actually bend around pin 65 as a pivot point. This is represented by the dotted line showing of bumper 32' in FIG. 7. In addition, it is to be especially noted that the bumper outwardly of its weakened portion, on both sides thereof, is extremely rigid so that it will remain straight to act as a deflecting surface.

Figures 8, 9, 10:
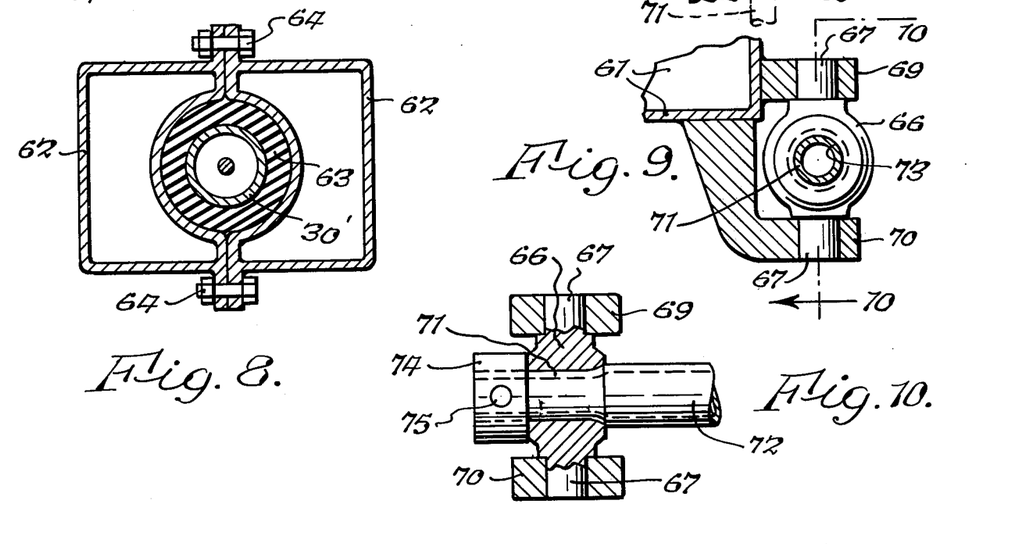
FIG. 8 is a cross sectional view taken substantially along line 8—8 of FIG. 7 and showing the central impact energy absorber unit supported for rectilinear sliding movement on a vehicle frame.
FIG. 9 is a fragmentary cross sectional view taken substantially along line 9—9 of FIG. 7 and showing a trunnion mounting for the inner end of the outer impact energy absorbing units and also showing the structure for swaging the adjacent portion of the units to provide additional energy absorption.
FIG. 10 is a fragmentary cross sectional view taken substantially along line 10—10 of FIG. 9.

When there is an impact to drive the bumper 32' to the dotted line position, energy absorber unit 31' will deflect to the dotted line position shown in FIG. 7. The frame ends of energy absorbers 31' are each received by a trunnion 66 which has its opposite ends 67 pivotally supported by brackets 69 and 70 secured to frame 61. Energy absorber unit 31' may have a construction identical to that shown in FIGS. 13 and 14, except for the fact that the ends adjacent frame members 61 do not have ball and socket connections. In the embodiment of FIGS. 7-10, the tubular end portion is reduced at 71 where it is received in the circular opening 73 in trunnion 66. The energy absorber is caused to be reduced in diameter from the size shown at 72 to the size shown at 71 by a swaging action as portion 72 is forced through the opening 73 in trunnion member 66. Thus, energy absorber units 31' will provide a wet energy absorber stroke portion, and a first dry energy absorber stroke portion, as described above relative to FIGS. 13 and 14, and an additional dry energy absorber stroke portion as described above relative to FIGS. 9 and 10. A collar 74 and a pin 75 are mounted on the reduced portion 71 to prevent it from being pulled forwardly. In this respect, the sleeve 74 is shown in FIG. 7 for preventing the portion 76 from being withdrawn from trunnion member 66 on the left side of FIG. 7 when the centerpole impact causes the action shown. At this point it is to be noted that the liquid holding portion of energy absorber 31' terminates at 72' and that portion 72 is of tubular configuration, as shown in FIG. 10 so that it can be swaged. In other words, the portion 72 between 72' and collar 74 is a tubular member which does not contain any liquid. Furthermore, energy absorbers 31' will pull bumper 32' rearwardly to stress engine 19 rearwardly in its mounts, as described relative to FIG. 5.

The normal position of bumper 32' is shown in solid lines in FIG. 7. After a centerpole impact of sufficient magnitude, the bumper 32' will be deflected to the dotted line position of FIG. 7. However, as can be seen from FIG. 7, the frame side 62 will reinforce the right-hand portion of the bumper 32' so that both the bumper and its backup frame member will provide resistance against actual deformation of bumper 32' to thereby permit bumper 32' to efficiently carry out its deflection function as described in detail above.

Figures 11, 11A, 12:
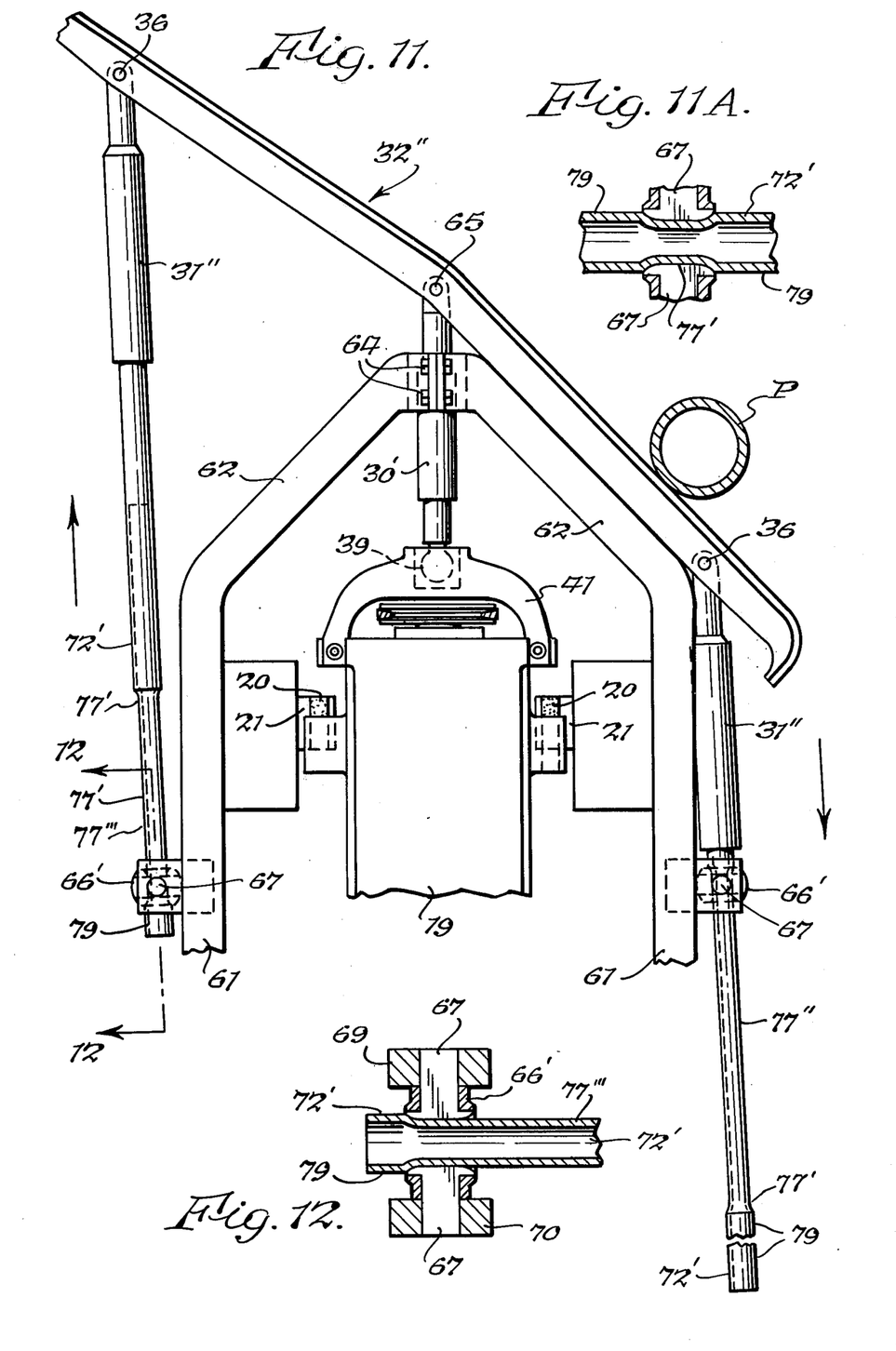
FIG. 11 is a fragmentary plan view similar to FIG. 7 but showing a further modified form of the invention in mounting a rigid bumper which does not fail at its center support but pivots about it and swages both of the outboard impact energy absorber units and uses the swaging phenomenon to absorb energy.
FIG. 11A is a fragmentary view showing the configuration of the undeformed ends of the outer energy absorber units which are mounted on the vehicle frame.
FIG. 12 is a fragmentary cross sectional view taken substantially along line 12—12 of FIG. 11 and showing the swaging of the frame and the outboard energy absorber.

In FIG. 11 a further modified form of the invention is disclosed. This form differs essentially from the embodiment of FIG. 7 in the fact that at the pivot point 65, the bumper 32" is not weakened, but will pivot in the same manner as described above relative to FIG. 5. Therefore, in the event that bumper 32" should engage a pole P, the following action occurs. First of all, energy absorber unit 30' will be caused to compress somewhat. It is to be noted that the frame portions 61, engine 19, yoke 41, and all related parts, are identical in structure to that described above relative to FIG. 7. The only difference resides in the construction of energy absorber units 31" and the rigid bumper 32", as mentioned above.

Whenever there is impact with a pole, there will be an extrusion of tubular portions 79 of energy absorber units 31". In this respect, before deformation, each portion 72' has the configuration of FIG. 11A wherein a reduced diameter portion 77' of relatively short axial length fits into swaging trunnion 66' having its opposite ends 67 mounted in frame portions 69 and 70, as described above relative to FIGS. 9 and 10. More specifically, in FIG. 11A the original construction of portion 72' prior to deformation is shown. In this respect, hollow tube portion 72' includes a small reduced diameter portion 77' which is received in the opening in trunnion 66'. On opposite sides of reduced portion 77' are portions 79 which are to be reduced by swaging upon impact, as shown in FIG. 11. As absorber 31'' was extended on the left of FIG. 11, the portion 77'''' (FIG. 11) to the rear of reduced portion 77' was swaged to provide an energy absorbing impact. In the absorber 31'' on the right of FIG. 11, the portion 79 in front of reduced portion 77'' was swaged to a reduced diameter as it was forced through swaging trunnion 66' to absorb the energy of impact. In FIG. 11, by a controlled deformation, the energy of impact is absorbed as the bumper 32'' is deflected to the position shown to provide a diverting camming action for moving the vehicle past the pole on impact, as shown in FIG. 3. The embodiment of FIG. 11 functions in the same manner as described above relative to FIG. 7 wherein frame portions 62 function as a back up for bumper 32''. Furthermore, energy absorbers 31' stress engine 19 rearwardly in its mounts, as described above relative to FIG. 5. Swaging trunnion 66' is similar to trunnion 66 of FIG. 10, except that it is made in two halves so that it can receive reduced portion 77' (FIG. 11A) of hollow tube 72' which extends rearwardly of the liquid energy absorber portion, as described relative to FIG. 5.

It is to be especially noted that while in the preferred embodiments of the present invention, the center energy absorber is coupled to the engine so that the forward momentum of the engine can aid in dissipating the energy of impact, it is within the contemplation of the present invention that the central portion of the bumper be pivoted directed to the frame, with decreased energy absorbing capacity, and in the latter construction only the two outer energy absorber units would be used with a high strength lightweight bumper.

While preferred embodiments of the present invention have been disclosed, it will be appreciated that it is not limited thereto, but may be otherwise embodied within the scope of the following claims.

What is claimed is:

1. An energy management system for a vehicle comprising a vehicle frame, high strength bumper means capable of maintaining its original configuration at the point of impact and having a central portion and outer end portions on opposite sides of said central portion, mounting means mounting said central portion relative to said frame for permitting said outer end portions to effectively swing about said central portion, impact energy absorber unit means effectively mounted between said outer end portions and said frame to thereby absorb the shock of impact while permitting said high strength bumper means to swing about said central portion while maintaining its original configuration outwardly of said central portion toward said outer end portions to thereby deflect said vehicle after impact, said mounting means comprising second impact energy absorber unit means and a pivotal connection between said bumper and said second impact energy absorber unit means, and a second pivotal connection between said second impact energy absorber unit means and said frame.

2. An energy management system as set forth in claim 1 including third pivotal connections effectively located between said impact energy absorber unit means and said frame.

3. An energy management system as set forth in claim 2 including fourth pivotal connections between said energy absorber unit means and said bumper.

4. An energy management system as set forth in claim 3 including supplementary impact energy absorber unit means proximate said third pivotal connections.

5. An energy management system as set forth in claim 4 wherein said supplementary impact energy absorber unit means comprise a swaging die for receiving a portion of said energy absorber unit means which is to be reduced on impact.

6. An energy management system as set forth in claim 1 including an engine on said frame wherein said second pivotal connection is between said second impact energy absorber unit means and said engine.

7. An energy management system as set forth in claim 6 including third pivotal connections between said impact energy absorber unit means and said frame.

8. An energy management system as set forth in claim 7 including fourth pivotal connections between said impact energy absorber unit means and said bumper.

9. An energy management system for a vehicle comprising a vehicle frame, high strength bumper means capable of maintaining its original configuration at the point of impact and having a central portion and outer end portions on opposite sides of said central portion, mounting means mounting said central portion relative to said frame for permitting said outer end portions to effectively swing about said central portion, impact energy absorber unit means effectively mounted between said outer end portions and said frame to thereby absorb the shock of impact while permitting said high strength bumper means to swing about said central portion while maintaining its original configuration outwardly of said central portion toward said outer end portions to thereby deflect said vehicle after impact, said mounting means comprising second impact energy absorber unit means, first connecting means between said second impact energy absorbing unit means and said frame, second connecting means between said impact energy absorbing unit means and said bumper, an engine on said frame, and wherein said first connecting means comprises a first connection between said engine and said impact energy absorber unit means, and a sliding connection between said energy absorber unit means and said frame.

10. An energy management system as set forth in claim 9 wherein said frame in the area of said second connection has rearwardly inclined sides.

11. An energy management system as set forth in claim 10 including third pivotal connections between said impact energy absorber unit means and said bumper, and fourth pivotal connections between said impact energy absorber unit means and said frame.

12. An energy management system as set forth in claim 11 including supplementary energy impact absorbing means at said fourth pivotal connections.

13. An energy management system for a vehicle comprising vehicle frame, high strength bumper means capable of maintaining its original configuration at the point of impact and having a central portion and outer end portions on opposite sides of said central portion, mounting means mounting said central portion relative to said frame for permitting said outer end portions to effectively swing about said central portion, impact energy absorber unit means effectively mounted between said outer end portions and said frame to thereby absorb the shock of impact while permitting said high strength bumper means to swing about said central portion while maintaining its original configuration outwardly of said central portion toward said outer end portions to thereby deflect said vehicle after impact, said mounting means comprising second impact energy absorber unit means, an engine on said frame, said second impact energy absorber means being mounted directly between said bumper and said engine, and means mounting said engine rearwardly on its mounts to permit said engine to move forwardly relative to said frame on impact.

14. An energy management system as set forth in claim 13 including a pivotal connection between said engine and said second impact energy absorber unit means.

15. An energy management system as set forth in claim 14 including a second pivotal connection between said second energy absorber unit means and said bumper.

16. An energy management system as set forth in claim 13 including first pivotal connections between said impact energy absorber unit means and said frame, and second pivotal connections between said outer end portions of said bumper and said impact energy absorber unit means.

17. An energy management system as set forth in claim 16 wherein said impact energy absorber unit means include liquid energy absorber means and dry energy absorber means.

* * * * *